United States Patent
Noh

(10) Patent No.: US 7,774,632 B2
(45) Date of Patent: Aug. 10, 2010

(54) ADAPTIVE POWER MANAGEMENT METHOD IN PORTABLE ELECTRONIC DEVICE

(75) Inventor: Tae-kwon Noh, Ulwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 599 days.

(21) Appl. No.: 11/775,300

(22) Filed: Jul. 10, 2007

(65) Prior Publication Data

US 2008/0168289 A1    Jul. 10, 2008

(30) Foreign Application Priority Data

Jan. 9, 2007    (KR) ...................... 10-2007-0002678

(51) Int. Cl.
*G06F 1/32* (2006.01)

(52) U.S. Cl. ..................... 713/322; 713/320; 713/323

(58) Field of Classification Search ............... 713/300, 713/320, 322, 323, 324

See application file for complete search history.

(56) References Cited

U.S. PATENT DOCUMENTS

| | | | | |
|---|---|---|---|---|
| 5,778,237 A | * | 7/1998 | Yamamoto et al. | 713/322 |
| 6,389,476 B1 | * | 5/2002 | Olnowich | 709/233 |
| 7,346,787 B2 | * | 3/2008 | Vaidya et al. | 713/300 |
| 7,434,171 B2 | * | 10/2008 | Clapper | 715/771 |
| 2002/0032875 A1 | * | 3/2002 | Kashani | 713/300 |

FOREIGN PATENT DOCUMENTS

KR    2004-46863    6/2004

* cited by examiner

*Primary Examiner*—Dennis M Butler
(74) *Attorney, Agent, or Firm*—Jefferson IP Law, LLP

(57) ABSTRACT

A power management method in a portable electronic device includes storing a plurality of pieces of sub-state information indicating setting states of functions from a user interface (UI) of the portable electronic device, constructing a field by combining sectors, each formed with a predetermined number of bits, indicating the plurality of pieces of sub-state information, analyzing the sub-state information of the field, and selecting a clock frequency corresponding to the analyzed field from among clock frequencies pre-set to operate a central processing unit (CPU) of the portable electronic device and applying the selected clock frequency to the CPU. Accordingly, by combining information on sub-states indicating functions currently set in a portable electronic device in order to construct a field and selecting a clock frequency optimal for the field, an unnecessary increase of a CPU clock frequency in multi-tasking can be prevented, and power of a CPU can be efficiently managed.

24 Claims, 3 Drawing Sheets

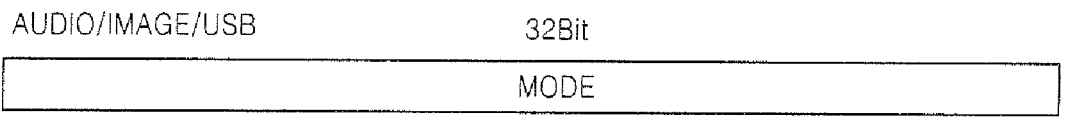

ADAPTIVE POWER MANAGEMENT METHOD IN PORTABLE ELECTRONIC DEVICE

CROSS-REFERENCE TO RELATED APPLICATIONS

This application claims all benefits accruing under 35 U.S.C. §119 from Korean Patent Application No. 2007-2678, filed on Jan. 9, 2007, in the Korean Intellectual Property Office, the disclosure of which is incorporated herein by reference.

BACKGROUND OF THE INVENTION

1. Field of the Invention

Aspects of the present invention relate to a power management method, and more particularly, to an adaptive power management method in a portable electronic device, in which power consumed in a main module such as a central processing unit (CPU) is saved by adjusting an operational clock frequency of the CPU according to a use state in the portable electronic device.

2. Description of the Related Art

Recently, MP3 players allowing users to conveniently listen to music by storing audio and music files in a memory and Portable Multimedia Players (PMPs) allowing users to view a moving picture by means of a display unit by storing video files have been developed, and portable terminals having an MP3 function, an PMP function, and a digital camera function are available on the market.

With these portable electronic devices, there has been a trend towards combining the various functions. However, because of size and weight limitations, batteries that are used with portable electronic devices typically have a limited capacity, even when fully charged. Accordingly, the development of portable electronic devices that can perform various functions while simultaneously maintaining a long battery life between recharging has become important for user convenience.

For the portable electronic devices, a power management method for controlling a CPU clock frequency to efficiently use available battery capacity has been developed. CPUs of portable electronic devices are limited in terms of their operational clock frequency, since as the CPU clock frequency increases, the power consumption in the CPU increases, thereby reducing the battery life. Thus, portable electronic devices need to maintain an optimal CPU clock frequency according to an operational state.

For example, when a moving picture is reproduced, the CPU of an electronic device having a function of reproducing video and music typically must maintain the maximum clock frequency in order to run the video reproduction application without any problem. However, when only music files, such as MP3 files, are reproduced while a display unit such as a Liquid Crystal Display (LCD) is in an "off" state, the maximum clock frequency is not needed, and the power consumption of the electronic device can be reduced by decreasing the clock frequency to a predetermined value suitable for reproducing only music files.

FIG. 1 is a diagram of a portable electronic device utilizing a conventional power management method for power management. In the power management software configuration illustrated in FIG. 1, a user interface state 18 of a multifunctional device such as, for example, a multi-function MP3 player, can be classified into a power "on" state, a power "off" state, an idle state, and a normal state. The normal state can be classified into sub-states 19 indicating states for performing, for example, an audio function, an image function, frequency modulation (FM), universal serial bus (USB), and an encoding function.

A reception module 10 receives information on each sub-state indicating an audio, image, FM, reproduction, or image reproduction setting state from the user interface 18 and separately stores the information. An analysis module 12 analyzes the information and transmits the analysis result to an adaptation module 14. The adaptation module 14 calculates an operational clock frequency for the CPU using a lookup table 16 and adding the clock frequency for the power level corresponding to the setting state of each sub-state.

The power level for each of the audio, image, USB, and encoding modes and the power level for each of the audio effects and LCD on/off modes are independently defined. In order to determine the power level when an MP3 player performs multi-tasking for processing audio and images at the same time or when the MP3 player adds an audio effect function to audio reproduction, the clock frequencies of the power levels are simply set according to relevant modes determined in advance and are added together without any condition. Therefore, power may be unnecessarily wasted.

For example, if a processing speed of 30 million instructions per second (MIPS) is required to reproduce an MP3 file and a processing speed of 20 MIPS is required to perform a Digital Natural Sound engine (DNSe) audio effect, in the conventional power management method, if these two functions are used at the same time, a CPU clock frequency corresponding to 50 MIPS is calculated by simply adding the processing speeds corresponding to the two selected functions. However, if these two functions are capable of working together with a CPU clock frequency corresponding to only 40 MIPS, the CPU clock frequency calculated by the above method is 10 MIPS higher than it needs to be, and excessive power consumption occurs.

SUMMARY OF THE INVENTION

Several aspects and example embodiments of the present invention provide an adaptive power management method in a portable electronic device, whereby a plurality of pieces of sub-state information from a user interface (UI) of the portable electronic device are combined into a field, and an optimal CPU clock frequency set so as to correspond to the field in advance is selected.

Additional aspects and/or advantages of the invention will be set forth in part in the description which follows and, in part, will be obvious from the description, or may be learned by practice of the invention.

According to an example embodiment of the present invention, there is provided a power management method in a portable electronic device, the method comprising: storing a plurality of pieces of sub-state information indicating setting states of functions from a user interface (UI) of the portable electronic device; constructing a field by combining sectors, each formed with a predetermined number of bits, indicating the plurality of pieces of sub-state information; analyzing the sub-state information of the field; and selecting a clock frequency corresponding to the analyzed field from among clock frequencies pre-set to operate a processor of the portable electronic device and applying the selected clock frequency to the processor.

According to an aspect of the present invention, the clock frequency may be selected using a lookup table.

According to an aspect of the present invention, the field may be formed with 32 bits.

According to an aspect of the present invention, the lookup table may have optimal processor clock frequencies respectively assigned to a plurality of unique fields containing sub-state information.

According to an example embodiment of the present invention, there is provided a power management system in a portable electronic device, comprising: a reception module that receives, stores and transmits a plurality of pieces of sub-state information indicating setting states of functions from a user interface (UI); a combining module that receives the plurality of pieces of sub-state information from the reception module and constructs and transmits a field by combining sectors, each formed with a predetermined number of bits, indicating the plurality of pieces of sub-state information; an analysis module that receives the field from the combining module, analyses the sub-state information of the field and transmits an analysis result; and an adaptation module that receives the analysis result and selects a clock frequency corresponding to the analyzed field from among predetermined clock frequencies to operate a processor of the portable electronic device and that applies the selected clock frequency to the processor.

According to an example embodiment of the present invention, there is provided a portable electronic device comprising a power management system comprising: a user interface to transmit state and sub-state information; a control module to receive and store a plurality of pieces of sub-state information indicating setting states of functions from the user interface, to construct a field by combining sectors, each formed with a predetermined number of bits, indicating the plurality of pieces of sub-state information, to analyze the sub-state information of the field and select a clock frequency corresponding to the analyzed field from among predetermined clock frequencies to operate a processor of the portable electronic device and to apply the selected clock frequency to the processor; and a memory to store data correlating a plurality of unique fields containing sub-state information with corresponding predetermined clock frequencies.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIGS. 3A through 3E illustrate fields created by mixing sub-state information in the combining module illustrated in FIG. 2.

DETAILED DESCRIPTION OF THE EMBODIMENTS

Figure 1:
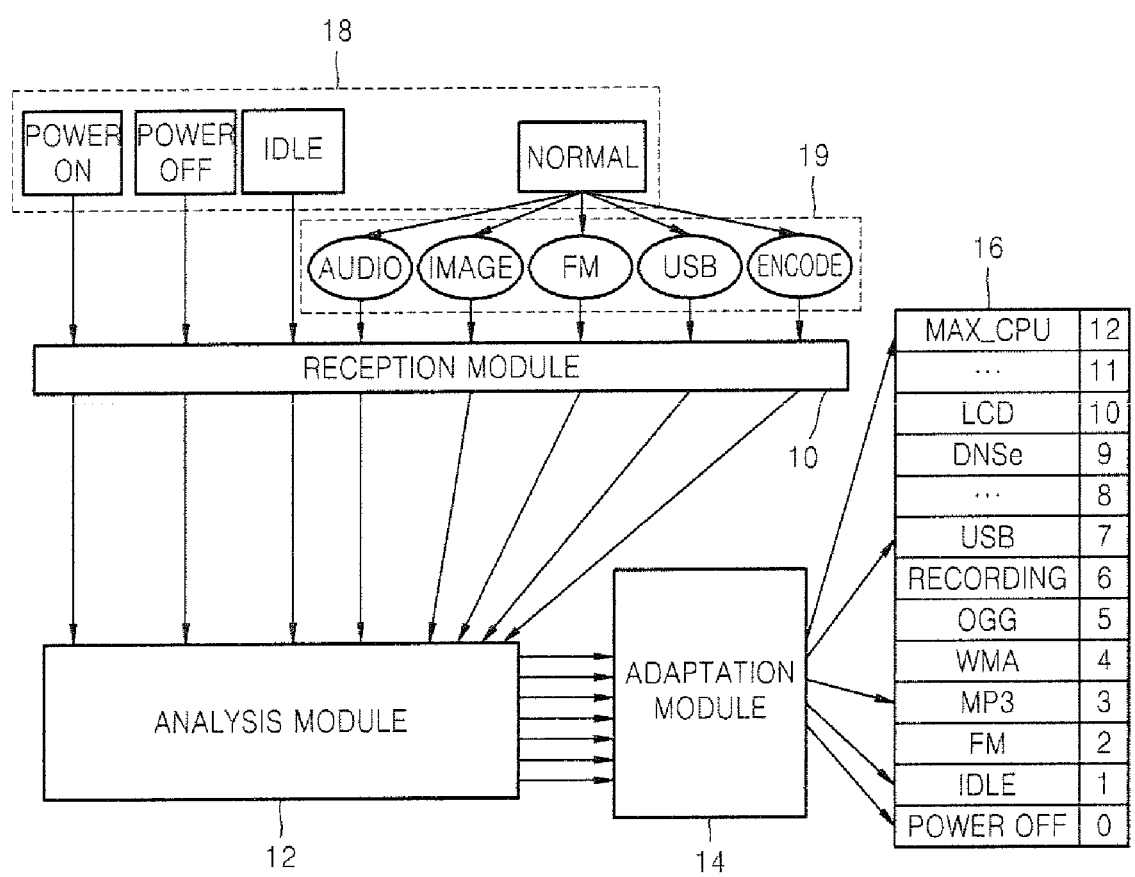
FIG. 1 is a diagram showing a conventional power management method in a portable electronic device.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
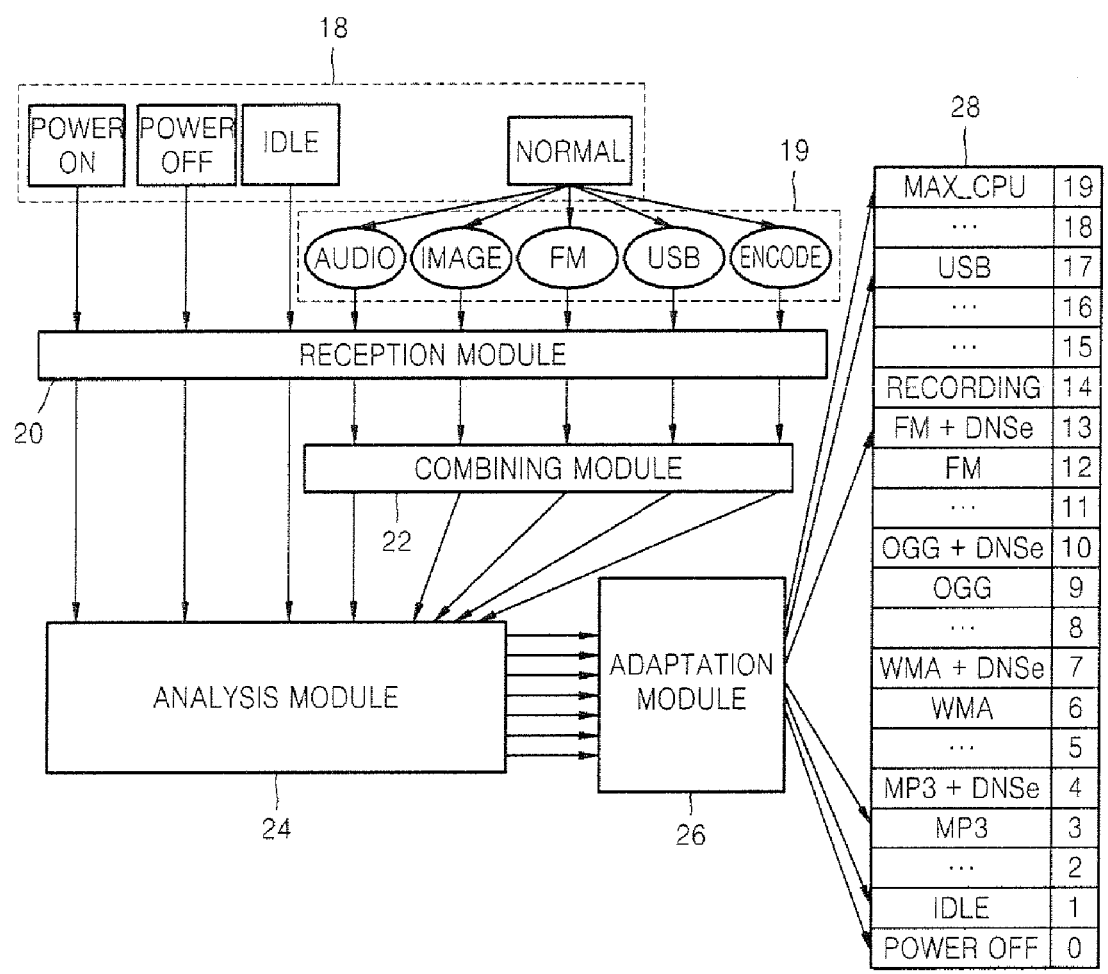
FIG. 2 is a diagram showing a power management method in a portable electronic device according to an example embodiment of the present invention.

FIG. 2 is a diagram showing a power management method in a portable electronic device according to an example embodiment of the present invention. As shown in FIG. 2, a reception module 20, an analysis module 24, and an adaptation module 26 of the power management software configuration respectively correspond to the functions of the reception module 10, the analysis module 12, and the adaptation module 14 shown in FIG. 1. Therefore, a description of these features is omitted for the sake of brevity.

The reception module 20 receives and stores information on each sub-state. For example, when the portable electronic device reproduces an MP3 file at 128 Kbps and simultaneously displays a 128×160 JPEG file on a LCD panel, the reception module 20 stores audio information and image information, which are information on sub-states 19 corresponding to the MP3 file and the JPEG file, and transmits the audio information and image information to a combining module 22.

Meanwhile, information on power "on", power "off", and idle states of a user interface (UI) 18 is directly transmitted from the reception module 20 to the analysis module 24.

The combining module 22 constructs a field by combining a plurality of pieces of received sub-state information, so that the adaptation module 26 sets a power level assigned in advance to the field.

FIGS. 3A through 3E illustrate fields created by combining a plurality of pieces of sub-state information in the combining module 22 illustrated in FIG. 2.

FIG. 3A illustrates a field formed with 32 bits, in which information on audio/image/USB sub-states is combined. The combining module 22 may construct a basic audio field, a basic image field, and a basic universal serial bus (USB) field as respectively illustrated in FIGS. 3C, 3D, and 3E based on the plurality of pieces of sub-state information received from the reception module 20 and then construct a user request field or a separate field for selecting a processor clock frequency, such as a CPU clock frequency, by combining the basic audio field, the basic image field, and the basic USB field into the field illustrated in FIG. 3A.

FIG. 3B illustrates a user request field created by combining an LCD on/off condition, an audio effect on/off condition, and a slide effect on/off condition, e.g. a Ken Burns effect on/off condition, which are pieces of sub-state information of an MP3 player. (The term "Ken Burns effect" refers to a way of displaying still photographic images in which slow zooming, panning and transitional fading are used to maintain visual interest.) In the field, each piece of sub-state information is made up of a sector formed with a predetermined number of bits.

The user request field is created as a result of combining pieces of sub-state information by the combining module 22 and is transmitted to the analysis module 24. The analysis module 24 analyzes received UI basic information and the user request field and transmits the analysis result to the adaptation module 26. In a lookup table 28, clock frequencies are pre-set corresponding to predicted user request fields and UI basic information. The adaptation module 26 can refer to the lookup table 28 using the value obtained by analyzing the UI basic information and the user request field.

The combining module 22 constructs a user request field by combining information on sub-states so that a CPU clock frequency of a power level can be selected for the portable electronic device having a multi-tasking function. Thus, the adaptation module 26 can determine functions set in the portable electronic device from information on sub-states by checking an analyzed user request field.

The adaptation module 26 operates the CPU by selecting an optimal CPU clock frequency with reference to the lookup table 28. For example, the lookup table 28 may specify a single clock frequency corresponding to a field containing MP3 reproduction and Digital Natural Sound engine (DNSe) functions. Thus, when the MP3 reproduction and DNSe functions are performed at the same time, the CPU operates at the clock frequency specified by the look-up table for this combination of functions. Typically, the clock frequency specified in the look-up table 28 is less that the clock frequency calculated by adding the clock frequencies of the functions taken separately. Using the example described above, the look-up table 28 may specify a clock frequency of 40 MIPS, which is less than the 50 MIPS obtained by simply adding 30 MIPS for MP3 reproduction 20 MIPS for the DNSe function as a conventional MP3 player under the same conditions. Therefore, unnecessary power consumption can be prevented.

As described above, according to aspects of the present invention, by combining information on sub-states indicating functions currently set in a portable electronic device in order to construct a field and selecting a clock frequency optimal for the field, an unnecessary increase of a CPU clock frequency in multi-tasking can be prevented, and the power of a CPU can be efficiently managed.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the method according to aspects of the present invention is not limited to consumer electronic devices, but rather can be applied to any portable electronic device that includes a CPU and that has multi-tasking functions. In addition, various components shown in FIG. 2, including the reception module 20, the combining module 22, the analysis module 24 and the adaptation module 26, can be integrated into a single control unit or module performing all of the functions described. Further, the example embodiment can be implemented in software or hardware, such as, for example, an application specific integrated circuit (ASIC). As such, it is intended that the processes described herein be broadly interpreted as being equivalently performed by software, hardware, or a combination thereof. As previously discussed, software modules can be written, via a variety of software languages, including, for example, C, C++, Java, Visual Basic, and many others. These software modules may include data and instructions that can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals. Accordingly, it is intended, therefore, that the present invention not be limited to the various example embodiments disclosed, but that the present invention includes all embodiments falling within the scope of the appended claims.

What is claimed is:

1. A power management method in a portable electronic device, the method comprising:
   storing a plurality of pieces of sub-state information indicating setting states of functions from a user interface (UI) of the portable electronic device;
   constructing a field by combining sectors, each formed with a predetermined number of bits, indicating the plurality of pieces of sub-state information;
   analyzing the sub-state information of the field; and
   selecting a clock frequency corresponding to the analyzed field from among pre-set clock frequencies to operate a processor of the portable electronic device and applying the selected clock frequency to the processor.

2. The method of claim 1, wherein the plurality of pieces of sub-state information include user selected settings to perform an audio function, an image function, a universal serial bus (USB) function or an encoding function.

3. The method of claim 1, further including analyzing UI basic information before selecting the clock frequency.

4. The method of claim 3, wherein the UI basic information comprises a power on state, a power off state and an idle state.

5. The method of claim 1, wherein the clock frequency is selected using a lookup table.

6. The method of claim 1, wherein the field is formed with 32 bits.

7. The method of claim 5, wherein the lookup table has optimal processor clock frequencies respectively assigned to a plurality of unique fields containing sub-state information.

8. The method of claim 7, wherein the plurality of unique fields corresponds to predicted user request fields.

9. A power management system in a portable electronic device, comprising:
   a reception module to receive, store and transmit a plurality of pieces of sub-state information indicating setting states of functions from a user interface (UI);
   a combining module to receive the plurality of pieces of sub-state information from the reception module and constructs and transmit a field by combining sectors, each formed with a predetermined number of bits, indicating the plurality of pieces of sub-state information;
   an analysis module to receive the field from the combining module, analyze the sub-state information of the field and transmit an analysis result; and an adaptation module to receive the analysis result and select a clock frequency corresponding to the analyzed field from among predetermined clock frequencies to operate a processor of the portable electronic device and to apply the selected clock frequency to the processor.

10. The power management system of claim 9, wherein the field is formed with 32 bits.

11. The power management system of claim 9, wherein the plurality of pieces of sub-state information include user selected settings to perform an audio function, an image function, a universal serial bus (USB) function or an encoding function.

12. The power management system of claim 9, wherein the analyzing module further analyzes UI basic information and wherein the adaptation module selects the clock frequency based on the analysis result of the sub-state information of the field and the UI basic information.

13. The power management system of claim 12, wherein the UI basic information comprises a power on state, a power off state and an idle state.

14. The power management system of claim 9, wherein the clock frequency is selected using a lookup table.

15. The power management system of claim 14, wherein the lookup table has optimal processor clock frequencies respectively assigned to a plurality of unique fields containing sub-state information.

16. The power management system of claim 15, wherein the plurality of unique fields corresponds to predicted user request fields.

17. A portable electronic device comprising a power management system comprising:
a user interface to transmit state and sub-state information;
a control module to receive and store a plurality of pieces of sub-state information indicating setting states of functions from the user interface, to construct a field by combining sectors, each formed with a predetermined number of bits, indicating the plurality of pieces of sub-state information, to analyze the sub-state information of the field and select a clock frequency corresponding to the analyzed field from among predetermined clock frequencies to operate a processor of the portable electronic device and to apply the selected clock frequency to the processor; and
a memory to store data correlating a plurality of unique fields containing sub-state information with corresponding predetermined clock frequencies.

18. The portable electronic device of claim 17, wherein the control module comprises:
a reception module to receive, store and transmit the plurality of pieces of sub-state information indicating setting states of functions from the user interface;
a combining module to receive the plurality of pieces of sub-state information from the reception module and to construct and transmit the field;
an analysis module to receive the field from the combining module, analyze the sub-state information of the field and transmit an analysis result; and
an adaptation module to receive the analysis result and select the clock frequency corresponding to the analyzed field from among predetermined clock frequencies to operate the main processor of the portable electronic device and to apply the selected clock frequency to the main processor.

19. The portable electronic device of claim 17, wherein the field is formed with 32 bits.

20. The portable electronic device of claim 17, wherein the plurality of pieces of sub-state information include user selected settings to perform an audio function, an image function, a universal serial bus (USB) function or an encoding function.

21. The portable electronic device of claim 18, wherein the analyzing module further analyzes UI basic information and wherein the adaptation module selects the clock frequency based on the analysis result of the sub-state information of the field and the UI basic information.

22. The portable electronic device of claim 21, wherein the UI basic information comprises a power on state, a power off state and an idle state.

23. The portable electronic device of claim 17, wherein the data stored by the memory is in the form of a lookup table.

24. The portable electronic device of claim 23, wherein the plurality of unique fields corresponds to predicted user request fields.

* * * * *